(12) United States Patent
Phillips et al.

(10) Patent No.: US 11,386,413 B2
(45) Date of Patent: Jul. 12, 2022

(54) DEVICE-BASED TRANSACTION AUTHORIZATION

(71) Applicant: MASTERCARD INTERNATIONAL INCORPORATED, Purchase, NY (US)

(72) Inventors: Simon Phillips, York (GB); Patrik Smets, Nijlen (BE); Alan Johnson, Maldon (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/060,433

(22) Filed: Oct. 1, 2020

(65) Prior Publication Data

US 2021/0097523 A1    Apr. 1, 2021

Related U.S. Application Data

(60) Provisional application No. 62/908,897, filed on Oct. 1, 2019.

(51) Int. Cl.
*G06Q 20/32* (2012.01)
*G06Q 20/40* (2012.01)
(Continued)

(52) U.S. Cl.
CPC ......... *G06Q 20/3224* (2013.01); *G06N 20/00* (2019.01); *G06Q 20/3226* (2013.01); *G06Q 20/367* (2013.01); *G06Q 20/401* (2013.01)

(58) Field of Classification Search
None
See application file for complete search history.

(56) References Cited

U.S. PATENT DOCUMENTS 9,741,036 B1 *  8/2017  Grassadonia ........ G06Q 20/354
9,996,835 B2 *  6/2018  Dill ....................... G06Q 20/385
(Continued)

FOREIGN PATENT DOCUMENTS

KR    10-2012-0082644 A    7/2012

OTHER PUBLICATIONS

International Search Report and Written Opinion dated Jan. 29, 2021 which was issued in connection with a counterpart PCT Application No. PCT/US20/053382.

*Primary Examiner* — Namrata Boveja
*Assistant Examiner* — Amit Patel
(74) *Attorney, Agent, or Firm* — Buckley, Maschoff & Talwalkar LLC

(57) ABSTRACT

Pursuant to some embodiments, systems, methods and computer program code are provided for receiving a transaction request message, the transaction request message specifying transaction attributes for a proposed payment transaction involving a user of a mobile device and a merchant, comparing the transaction attributes with a permitted transaction rule, the permitted transaction rule having been stored in the mobile device prior to receiving the transaction request message, approving the proposed transaction upon determining that the transaction attributes satisfy the permitted transaction rule, the approving including generating a transaction cryptogram, and transmitting the transaction cryptogram to the merchant for use in completing the proposed payment transaction.

14 Claims, 6 Drawing Sheets

(51) Int. Cl.
*G06N 20/00* (2019.01)
*G06Q 20/36* (2012.01)

(56) References Cited

U.S. PATENT DOCUMENTS

| | | |
|---|---|---|
| 2006/0151598 A1 | 7/2006 | Chen et al. |
| 2013/0185206 A1 | 7/2013 | Leggett et al. |
| 2014/0114856 A1 | 4/2014 | Jung et al. |
| 2015/0073907 A1* | 3/2015 | Purves .................. G06Q 20/32 705/14.58 |
| 2018/0232734 A1 | 8/2018 | Smets et al. |
| 2018/0268406 A1 | 9/2018 | Rice et al. |
| 2019/0180277 A1 | 6/2019 | Vienravee |
| 2020/0111096 A1* | 4/2020 | Liu ...................... H04L 65/605 |

* cited by examiner

DEVICE-BASED TRANSACTION AUTHORIZATION

RELATED APPLICATIONS

This application claims benefit of and priority to U.S. Provisional Application Ser. No. 62/908,897 filed on Oct. 1, 2019, the contents of which are hereby incorporated by reference in their entirety for all purposes.

BACKGROUND

Remote payment transactions are increasingly common. For example, consumers frequently purchase goods or services from remote merchants via Internet or contact center transactions. These remote transactions involve the consumer providing the merchant with payment card information and the consumer's authorization to proceed with the transaction. Recently, many of these remote transactions involve payment enabled mobile devices or other payment applications operated by the consumer in which the consumer causes the application to generate a transaction cryptogram that utilizes a cryptographic key stored in the application. For example, the cryptogram may be generated using one or more items of transaction data and may be generated in accordance with specifications such as those promulgated by EMV Co. and available at http://www.emvco.com. In general, these transactions require interaction by the consumer for the transaction to proceed.

It is desirable to utilize these transaction cryptograms in more payment transactions as they help to reduce the risk of fraudulent transactions. It tends to be quite difficult for wrongdoers to obtain the means to duplicate the cryptogram-generating capabilities of payment cards or payment-enabled mobile devices.

Unfortunately, many types of payment transactions are not currently able to utilize these cryptograms. For example, in many electronic commerce transactions, there may be a partial shipment of ordered items. Such partial shipments may involve a partial payment which occurs after the initial transaction has completed (using payment card information stored by or on behalf of the merchant). In such a case, with current arrangements, it is not generally feasible to obtain a transaction cryptogram for the partial charge payment card account system transaction.

Another gap may occur with respect to so-called "card-on-file" situations. As is familiar to those who are skilled in the art, for some purposes it is convenient for the holder of a payment card to submit an account number or payment token for secure storage by a merchant, to allow the merchant to initiate recurring payment transactions using the account number or payment token. Examples of such recurring transactions occur in the case of monthly service charges by utilities or mobile or internet communication service providers, or in the case of monthly or annual subscription charges for newspapers, magazines, video or audio streaming services and the like. In these card-on-file arrangements, the merchant initiates each transaction without involvement by the account holder (apart from initial authorization of the recurring charges), and without generation of a cryptogram.

Aside from the undesirable absence of transaction cryptograms, card-on-file arrangements also present security risks that can arise if the merchants' data security measures prove to be inadequate and allow data breaches to occur. This has happened in a number of instances, resulting in compromise of customers' payment account numbers and fraudulent transactions arising therefrom, as well as inconvenience to customers and expense to issuers relating to replacement of account numbers, payment cards, etc.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DESCRIPTION

Figure 1:
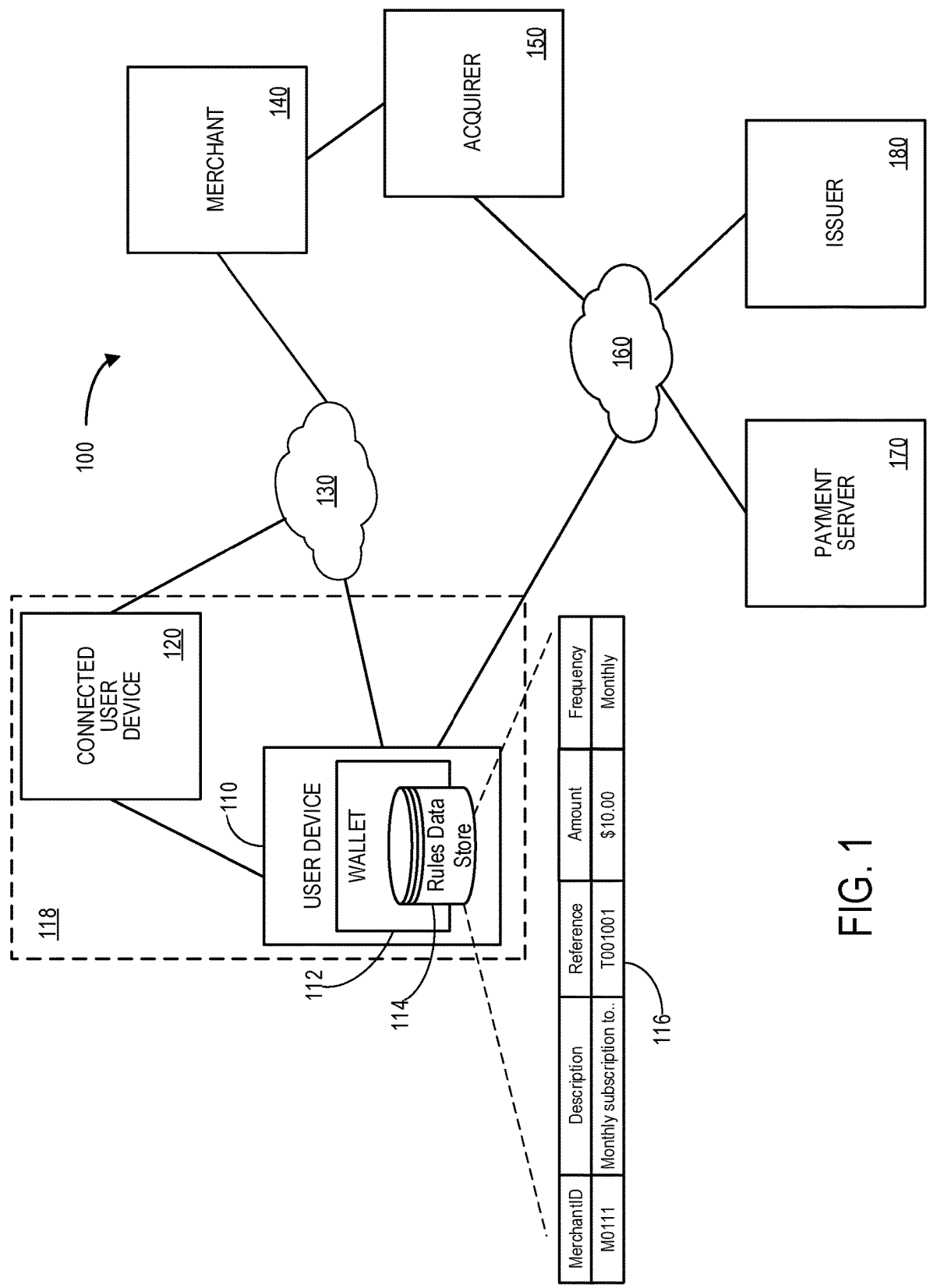
FIG. 1 is a block diagram of a system pursuant to some embodiments.

In general, and for the purpose of introducing concepts of embodiments of the present disclosure, according to a payment system disclosed herein, a payment-enabled mobile device handles requests for recurring payments and the like in an unattended manner. Such requests are received by the mobile device from merchant devices and are compared with rules previously stored in the mobile device to determine whether the requested payments meet the criteria spelled out in one of the rules. If so, the mobile device concludes that the requested payment was pre-authorized by the user/account holder. The mobile device then generates a transaction cryptogram based on transaction data such as the transaction amount. Next, the mobile device uploads to the merchant device an account number or payment token along with the cryptogram, to implement authorization by the mobile device of the requested transaction.

With this arrangement, card on file arrangements are replaced by payment device transactions with a cryptogram generated to secure each transaction. The interaction between the mobile device and the merchant device occurs in background as to the mobile device and is not communicated to, and does not require involvement by, the device user/account holder, apart from the user's previous installation of a relevant rule in the mobile device.

The present invention provides significant technical improvements to payment transactions which would otherwise require or allow a merchant to store or otherwise retain access to a user's payment account information. Pursuant to some embodiments, a merchant that wishes to conduct certain types of transactions involving a user and the user's payment account must submit a transaction request to a user device (or a payment server) and if information associated with the transaction request matches rules established by the user, then a transaction cryptogram is created using payment credentials of the user. The transaction then proceeds using that cryptogram, ensuring the transaction is secure and not susceptible to fraud. Further, because the merchant does not store or retain access to the payment information of a user, the risk of exposure of the payment information by unauthorized access is reduced or substantially eliminated. Embodiments provide substantial technical changes to the flow and sequencing of prior transactions. The present invention is directed to more than merely a computer implementation of a routine or conventional activity previously known in the industry as it significantly advances the technical efficiency, access and/or accuracy of interactions between devices by implementing a specific new method and system as defined herein. The present invention is a specific advancement in the area of remote transactions and provides benefits in security, privacy and the ability to generate transaction cryptograms in transactions that previously were unable to benefit from such cryptograms.

For convenience and ease of exposition, a number of terms are used herein. For example, the terms "user" or "consumer" are used herein to refer to an entity (such as an individual or a company) that interacts with a "user device" (such as a mobile device) to conduct transactions pursuant to the present invention. As used herein, the term "digital wallet" or "wallet application" refers to an application installed on a "mobile device" that allows a user to conduct payment transactions pursuant to the present invention (as well as, in some embodiments, payment transactions at standard points of sale). Each digital wallet or wallet application may store information associated with one or more payment cards associated with the user or consumer (such as, for example, credit cards, debit cards, charge cards or the like).

As used herein, a "mobile device" may be a portable device that can be transported and be operated by a user, and may include one or more electronic components (e.g., an integrated chip, etc.). A mobile device according to some embodiments may be in any suitable form including, but not limited to a mobile phone (e.g., smart phone, cellular phone, etc.), a tablet computer, a portable media player, a personal digital assistant device (PDA), a wearable communication device (e.g., watch, bracelet, glasses, etc.), an electronic reader device, a laptop, a netbook, an ultrabook, etc. A mobile device may also be in the form of a vehicle (e.g., a car) equipped with communication capabilities.

As used herein, the term "application cryptogram" or "cryptogram" or "authorization request cryptogram" ("ARQC") is used to refer to a cryptogram created by the wallet application which serves to ensure that an issuer or other entity in a payment network is able to authenticate that a payment request is associated with an authentic payment card and that the payment card data was not copied from a skimmed card. In some embodiments, the cryptogram is an ARQC cryptogram generated pursuant to the EMV specifications promulgated by EMV Co. (and available at https://www.emvco.com). In general, the cryptogram may be generated by the wallet application and may be the result of payment card, merchant and transaction data. The data may be encrypted by a key such as a DES key, and may be sent to the issuer or a stand in processor during a payment authorization process as will be described further herein.

FIG. 1 illustrates an exemplary system 100 in which one or more features of some embodiments of the present disclosure may be implemented. As shown, the system 100 includes a number of different entities, devices or other participants that interact to conduct transactions pursuant to some embodiments, including, for example, the rule creation process of FIG. 2 and the transaction process of FIG. 3.

As shown, system 100 includes a user device 110, a connected user device 120 and a merchant 140 in communication over a network 130 (such as the Internet). The merchant 140 is in communication with an acquirer 150. The acquirer 150 is in communication with a payment server 170 and an issuer 180 via a payment network 160. The networks 130, 160 and the interactions between devices or entities may include, without limitation, a wired and/or wireless network, a local or wide area network (such as the Internet), a mobile network, and/or another suitable public and/or private network capable of supporting communication among two or more of the components of the system 100 or any combination thereof. The payment network 160 may be a payment network such as the Banknet network operated by Mastercard International Incorporated.

Further, the multiple networks may be accessible to different ones of the illustrated components of FIG. 1 (even if illustrated as being between two specific parts of the system 100). For example, a private payment transaction network is made accessible to the payment network 160 to the acquirer 150, the payment server 170 and the issuer 180 and, separately, a public network (such as the Internet) is provided for communication between the merchant 140 and the acquirer 150 (e.g., via a website or application programming interfaces or the like) or through which a user operating a user device 110 may communicate.

While only individual devices or components are shown in FIG. 1 (to enable a description of transactions involving a single consumer pursuant to some embodiments), in implementation, the system 100 will consist of multiple ones of devices and components such as user devices 110, connected user devices 120, merchants 140, acquirers 150, payment servers 170 and issuers 180.

Prior to further discussion of the components and interactions of the system 100 pursuant to the present invention, a brief illustrative example will first be introduced. In the illustrative example, a consumer wishes to sign up for a streaming media service product offered by a merchant. The streaming media service costs $10.00 per month. The consumer wishes to use features of the present invention to manage the monthly payments to the merchant (and thereby enjoy the improved security and other benefits offered by the present invention such as the ability to avoid allowing the merchant to store the consumers' payment card information). The consumer interacts with a mobile wallet application 112 of a user device 110 associated with the user to configure one or more payment rules 116 associated with the proposed transaction.

The payment rules 116 specify the conditions that the consumer approves of in advance for the transaction. In the illustrative example, the consumer establishes a rule identifying the merchant (e.g., using a unique identifier associated with the merchant or the like), the frequency of payments (monthly) and the amount of each payment ($10.00). As will be described further below, other rules may also be established, including a description of the approved transaction (e.g., to remind the user what the transaction involves, such as "monthly subscription to streaming service"), a period of validity of the approval (e.g., "valid from Jan. 1, 2020 through Dec. 31, 2020"), whether price increases or variations may be permitted (e.g., +/−10%, etc.), a count of approved recurring transactions (e.g., "12"), etc. Establishment of these rules may be aided by one or more user interfaces presented to the user by the wallet application 112.

Once the rules have been established and stored in a rules data store 114 of the wallet application 112, the merchant 140 may submit a request to the consumer (e.g., via the user device 110) to initiate a payment transaction using the system of the present invention. The request from the merchant 140 may be transmitted to the user device 110 via network 130 (e.g., as a push transaction or other notification transmitted to the wallet application 112 or the like) or via payment network 160. The request from the merchant 140 may include information identifying the merchant, information identifying the transaction, an amount, or the like. The user device 110 (by operation of the wallet application 112) checks the rules data 114 stored in or associated with the wallet application 112 to verify that the user has approved the transaction. For example, the request received from the merchant 140 may indicate that the merchant wants to initiate a charge in the amount of $10 for "first month of streaming service".

The wallet application 112 compares the transaction request data with the rules 116 and determines that the user has pre-approved the transaction (that is, the user has already established rules permitting this specific transaction). The wallet application 112 then performs processing to generate a transaction cryptogram associated with a payment account of the consumer. In some embodiments, if the rules 116 established by the consumer are met, the wallet application 112 may automatically generate the transaction cryptogram on behalf of the consumer—without intervention by the consumer. In this way, embodiments allow substantially automated processing of transactions with a high degree of security and reduced fraud. Further, because embodiments allow processing of such transactions substantially without user intervention, these transactions may proceed even when the user is unavailable to respond to a merchant transaction request (e.g., the transactions may be successfully and securely completed even when the user is away from their mobile device for a prolonged period of time). In some embodiments, the rules 116 and wallet application 112 may be replicated on a payment server 170 allowing processing of these transactions even when the user and the user device 110 are unable to respond to the merchant request.

In the event the rules 116 match the information in the merchant transaction request and the wallet application 112 (or, in some embodiments, the payment server 170) has generated a transaction cryptogram with payment credentials, the transaction cryptogram and other payment account information is then returned to the merchant 140 for use by the merchant in creating a transaction authorization request involving the payment account as well as the cryptogram. The transaction authorization request is then provided to the acquirer 150 for normal payment authorization processing. In the example involving a recurring monthly transaction, this process may be repeated each month as the subscription becomes due for a renewal payment. In some embodiments, each rule specifies one or more periods of validity of the rule. For example, in the monthly streaming service illustrative example, the user may specify that the subscription will last for 12 monthly periods, or that the subscription is valid through a certain date, or that the subscription is valid until expressly canceled by the user.

In this manner, transactions that would otherwise not have the security and fraud prevention benefits of a transaction cryptogram are now able to enjoy those benefits. Because the consumer's wallet application 112 (or payment server 170) is involved in approving each transaction (based on rules established by the consumer), the merchant 140 is not required (or permitted) to store the consumer's payment card information, thereby reducing the risk of the unauthorized use of the payment card information. Further, because the consumer is in control of establishing (and updating) the rules associated with processing each transaction, the consumer is able to more easily cancel unwanted subscriptions. A number of other technical benefits will become apparent based on the following disclosure.

As discussed in the illustrative example, the consumer is associated with a user device 110 having a wallet application 112 and a rules data store 114. The user device 110 may be, for example, a mobile phone or other mobile device such as the mobile device 400 shown and described in conjunction with FIG. 4 further below. Mobile devices according to some embodiments can be configured to communicate with external entities (such as connected user devices 120, merchants 140, payment servers 170 or the like) through long range communications technologies and protocols such as cellular communication and Internet protocols. They may also be configured to communicate with other devices (such as other mobile devices 110, merchants 140 and connected user devices 120) using any suitable short or medium range communications technology including Bluetooth (classic and BLE—Bluetooth low energy), NFC (near field communications), IR (infrared), Wi-Fi, etc.

It is becoming increasingly common for users to operate or control more than one connected user device 120 as represented by area 118 of FIG. 1. For example, a user may operate user device 110 (which includes the wallet application 112 described herein) and also a connected user device 120 that is associated with the user. One illustrative example of such a connected user device 120 is a so-called "smart" speaker (such as the speakers provided by Amazon or Google). These smart speakers are able to recognize voice commands and perform actions based on those voice commands such as to order a product or service. Generally, a user's account associated with a smart speaker is linked or associated with the user's user device 110 (e.g., the user device 110 may include an application that is used to configure and control the smart speaker).

Another example of a connected user device 120 is a "smart tag" or connected component that allows a user to depress a button on the smart tag in order to order a product or service. Again, such a smart tag or connected component is typically linked or associated with the user's user device 110. Pursuant to some embodiments, transactions of the present invention may be initiated by a connected user device 120. Further, in some embodiments, user approval rules may be created (in part or in total) by a user's interaction with a connected user device 120.

While embodiments are shown and described herein as having rules data 114 stored at user devices 110, in some embodiments, some or all of the rules data may be stored, maintained and applied using one or more payment servers 170. For example, in some embodiments, a payment server 170 may perform unattended payment functions for a number of users. Each user may interact with the payment server 170 to create and store transaction authorization rules associated with the user, and the payment server 170 may receive and handle payment transaction requests received on behalf of the user in a similar manner as described herein with respect to processing using a wallet application 112 of a user device 110.

Figure 2:
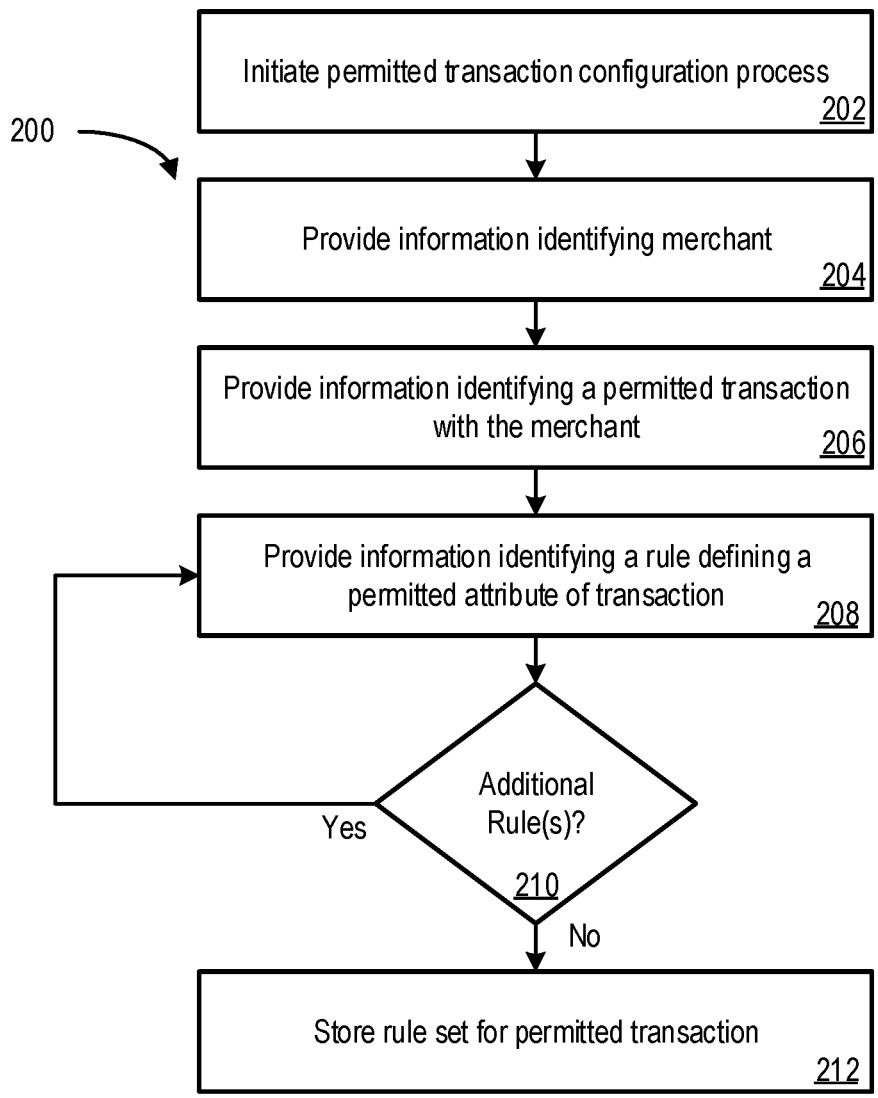
FIG. 2 is a flow diagram depicting a rule creation process according to some embodiments.

Features of transaction processes pursuant to the present invention will now be described by reference to FIGS. 2 and 3. FIG. 2 is a flow chart that illustrates an example of a process 200 that may be performed by the system 100 of FIG. 1. In particular, the process 200 is a process in which a user establishes one or more transaction processing rules pursuant to some embodiments. In some embodiments, a user interacts with a user device 110 to establish one or more rules associated with a transaction. The interaction may begin with the user viewing information about a product or service on a merchant website or in a merchant application, and then choosing to use features of the present invention to configure transaction rules for a purchase of the product or service from the merchant. Using the illustrative example introduced above where the user is purchasing a recurring subscription to a streaming service, the process 200 may begin with the user interacting with the streaming service provider, and then selecting to initiate a permitted transaction configuration process using the wallet application 112 of the user device 110. The term "permitted transaction" is used herein to generally refer to a transaction that complies with rules established by the user. If a transaction is presented to the wallet application 112 that satisfies the rules, then that transaction is a permitted transaction and will be handled using the processing described further below in conjunction with FIG. 3. As used herein, the "permitted transaction configuration process" is a process in which the user establishes one or more rules that must be met by a transaction to be approved by the wallet application 112 on behalf of the user.

Processing begins at 202 where the user initiates a permitted transaction configuration process. Processing at 202 may be initiated from a checkout page on a merchant website, from the user entering information about a permitted transaction, from the wallet application 112 receiving a set of rules from a user connected device 120, etc. Processing at 202 may include creating a new record in a rules data store 114 (or in a similar rules data store at a payment server 170). Processing continues at 204 where information is provided identifying the merchant involved in the permitted transaction. This information may be entered by the user or it may be populated using information provided by the merchant or from another device (such as a user connected device 120 or the like). In general, the information identifying the merchant should allow for the permitted transaction rule to easily be identified when a transaction request is eventually received (e.g., when the streaming service renewal is due). For example, the information identifying the merchant may be or include a merchant identifier or the like. In some embodiments, the user device 110 may also include or be in communication with a machine learning module or application that monitors how a user establishes rules for different types of transactions. For example, the machine learning module may discern that the user always permits recurring transactions that involve monthly charges of less than $10. In some embodiments, once the machine learning module has a sufficiently high level of confidence that it the user would create a certain rule that the machine learning module may be operated to configure the rules in the rules data store 114 for certain transactions.

Processing continues at 206 where information is provided identifying the permitted transaction with the merchant. Again, this information may be provided by the user interacting with the wallet application 112 or it may be received from the merchant or from another source. In general, the information identifying the permitted transaction includes sufficient information to allow the permitted transaction rule to easily be identified when a transaction request is received. The transaction information may include a stock keeping unit ("SKU") or other identifier of the product(s) or services(s) associated with the transaction (or an overall transaction identifier).

Processing continues at 208 where information is provided identifying a rule defining a permitted attribute of the transaction. For example, the attribute may be a price, a price range, a date, a date range, a count of transactions, or the like. Processing at 208 repeats until all the attributes are entered that the user wishes to specify to define the permitted transaction. In the illustrative example, the attributes may simply be a price ($10) and a frequency (monthly). Once all the rules have been established, processing terminates at 212 and the rule set is stored and set as available for use. In some embodiments, the rules established may also include one or more handling rules. For example, the user may specify which payment account of the user should be used in conjunction with the transaction. As discussed above, in some embodiments, a machine learning module or application may be configured to monitor a user's creation of rule sets for different transactions such that the machine learning module may be used to automatically configure certain rule sets for certain types of transactions on behalf of the user. In some embodiments, a machine learning module training application may be operated to allow a user to further train and refine the machine learning module to ensure the module has a high degree of accuracy in establishing rules on behalf of the user.

Figure 3:
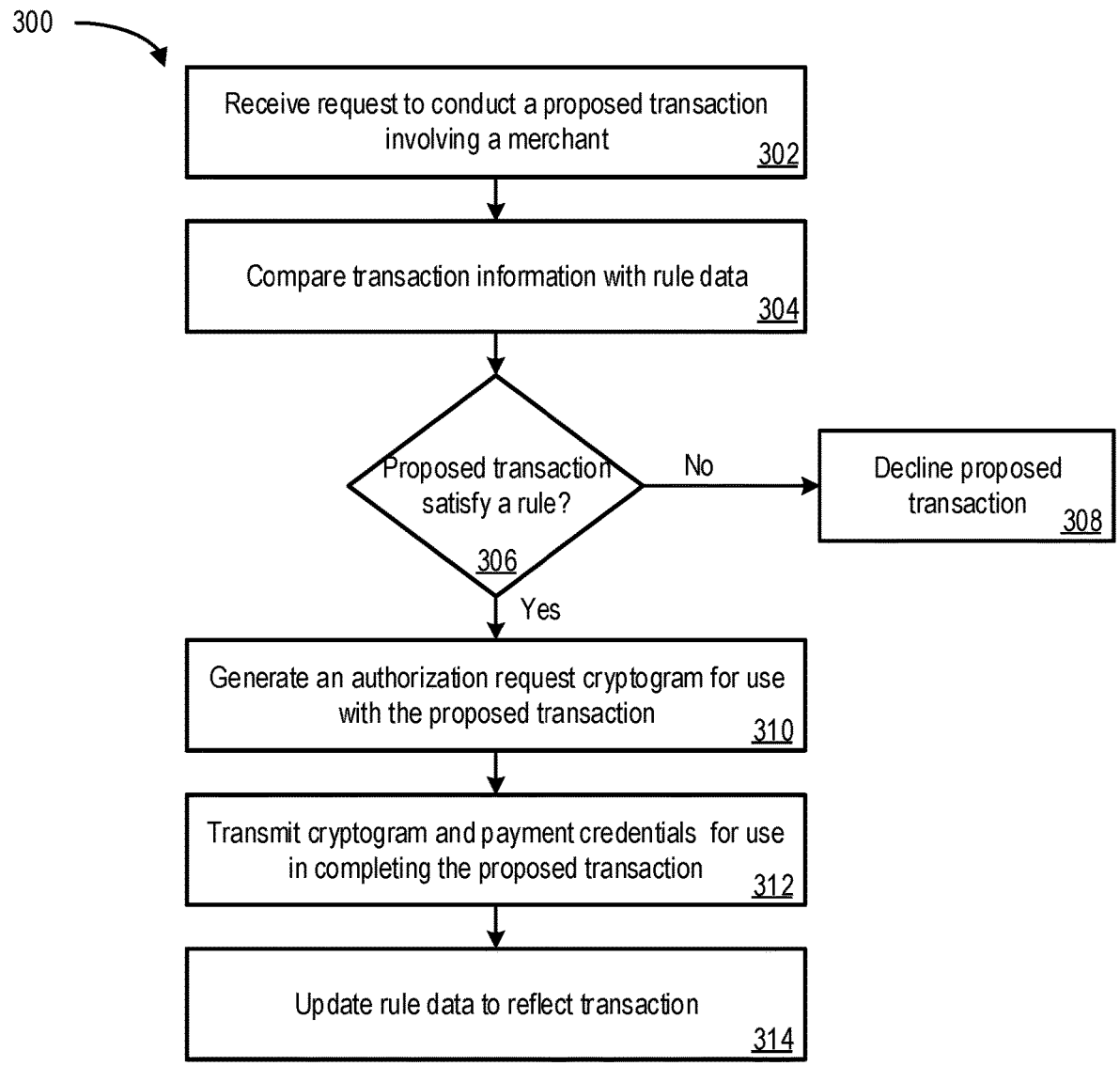
FIG. 3 is a flow diagram depicting a transaction process according to some embodiments.

FIG. 3 is a flow chart that illustrates an example of a process 300 that may be performed in the system 100 of FIG. 1, according to aspects of the present disclosure. In particular, FIG. 3 reflects functions performed by the user device 110 (or, in some embodiments, a payment server 170) in connection with a transaction requested by the merchant 140.

The process 300 begins at 302 where a request is received (by either the user device 110 or, in some embodiments, the payment server 170) to conduct a proposed transaction involving a merchant. In general, the request received at 302 is generated by the merchant, and may be, for example, a request to conduct one transaction in a series of recurring transactions. It may also be a request to conduct a partial payment transaction in a partial shipment situation. It may be a request to conduct a transaction initiated by a connected user device or any other transaction that would (but for the use of the present invention) otherwise require that the merchant store or retain payment credentials of the user. In some embodiments, the request received at 302 includes information identifying the proposed transaction including information identifying the merchant, details of the proposed transaction, a proposed transaction amount, etc. In some embodiments, the request is received in a message delivered directly to the wallet application 112 of the user device 110 (e.g., via an API or other interface). In this manner, the wallet application 112, upon receipt of the request, may substantially automatically process the request at 304 by comparing the received information about the proposed transaction with rules data 116 stored in (or accessible to) the wallet application 112 of the user device 110.

The request received from the merchant 140 may include a number of attributes associated with the proposed transaction. In a simple example, the transaction attributes may be the name of or identifier for the merchant 140, the monetary amount requested to be paid, and an indication of the ongoing service for which the payment is to be made (e.g., internet service, cable television service, streaming service, etc.) In some other examples, the proposed transaction request may contain a description or indicator (e.g., an SKU (stock keeping unit)) for an item or items of goods being purchased; a merchant category code (MCC), a delivery address (street address) or delivery location (by global positioning system (GPS) coordinates), and/or an expected delivery date for the goods (if goods are being purchased).

Processing continues at 306 where the wallet application 112 operates to determine whether the proposed transaction satisfies a rule in the rules data 116. For example, the wallet application 112 attempts to identify a rule set that matches the proposed transaction (e.g., by first finding rule(s) associated with the merchant) and then parsing those rule(s) to determine if the amount, date and other attributes of the proposed transaction satisfy a rule. In the illustrative example, if the proposed transaction is a recurring transaction for a streaming service but the amount is for $15, the rules of the illustrative example would result in the transaction being declined at 308. In the event a proposed transaction is declined, a message may be transmitted to the merchant 140 indicating that the proposed transaction failed to match a permitted transaction established by the user and the merchant 140 may be directed to contact the user. In some embodiments, the user may specify a preferred method of contact in the event that a proposed transaction is declined at 308 (e.g., the user may specify rules for handling declined transactions, and may specify different methods of contact for different merchants or different transaction types).

In some embodiments, one or more system rules may also be applied for each proposed transaction. As an example, a system rule may be that a transaction not be conducted twice. This system rule may be applied by the wallet application 112 to determine whether the proposed transaction has already been processed. For example, in some embodiments, the wallet application 112 may have access to or store information associated with a transaction history of the payment accounts associated with the wallet application 112. In the illustrative example, processing at 306 may include automatically applying the system rule to confirm that this month's payment for the subscription service has not previously been paid.

In the illustrative example, if the proposed transaction request received from the merchant at 302 is for a recurring transaction for a streaming service in the amount of $10, processing at 306 is satisfied (i.e., the proposed transaction details satisfy the permitted transaction rules 116) and processing continues at 310 where the wallet application 112 is operated to generate an authorization request cryptogram for use with the proposed transaction. More particularly, pursuant to some embodiments, processing at 310 may involve operating the wallet application 112 on the user device 110 to generate a transaction cryptogram for the proposed transaction in unattended fashion (e.g., substantially without user intervention). The cryptographic process that results in the cryptogram may be performed in accordance with a known standard/protocol (e.g., an EMV protocol) for generating payment system transaction cryptograms. Inputs to the cryptographic process may include the merchant identifier, the payment account number or payment token to be used to conduct the transaction, the transaction amount, and the current date, such that the cryptogram is bound to the specific payment transaction now being authorized. The cryptographic process uses an encryption key that is associated with the payment system account to be charged for the current transaction.

Processing continues at 312 where the wallet application 112 and the user device 110 operate to transmit the authorization request cryptogram to the merchant 140 for use in completing the proposed transaction. In some embodiments, processing at 312 also includes transmitting payment account information to the merchant 140. In general, processing at 312 includes providing the merchant 140 with the information needed to complete the proposed transaction—a cryptogram as well as payment account information. In this manner, a secure and fraud resistant transaction may be conducted without requiring or permitting the merchant 140 to store sensitive payment credentials. Instead, the merchant 140 simply forwards the received information to a merchant acquirer 150 using standard payment authorization request processing techniques. At this point, the transaction processes as if it were a normal payment network transaction. The authorization request message is routed from the acquirer 150 to the issuer 180 via the payment network 160. The issuer 180 (or a stand-in processor for the issuer, in some situations) determines whether to authorize the transaction using the selected payment account and, if so, returns an authorization response message to the acquirer 150 which then provides a response to the merchant 140.

The process 300 may end with the wallet application 112 updating the rules data sore 114 to reflect the completion of the proposed payment transaction (e.g., to ensure that the permitted transaction rules for that transaction are not reused). While the process 300 of FIG. 3 has been described primarily with reference to rules applied using a wallet application 112 of a user device 110, in some embodiments, the same processing may be performed using a payment server 170 which acts on behalf of one or more user devices 110.

Figure 4:
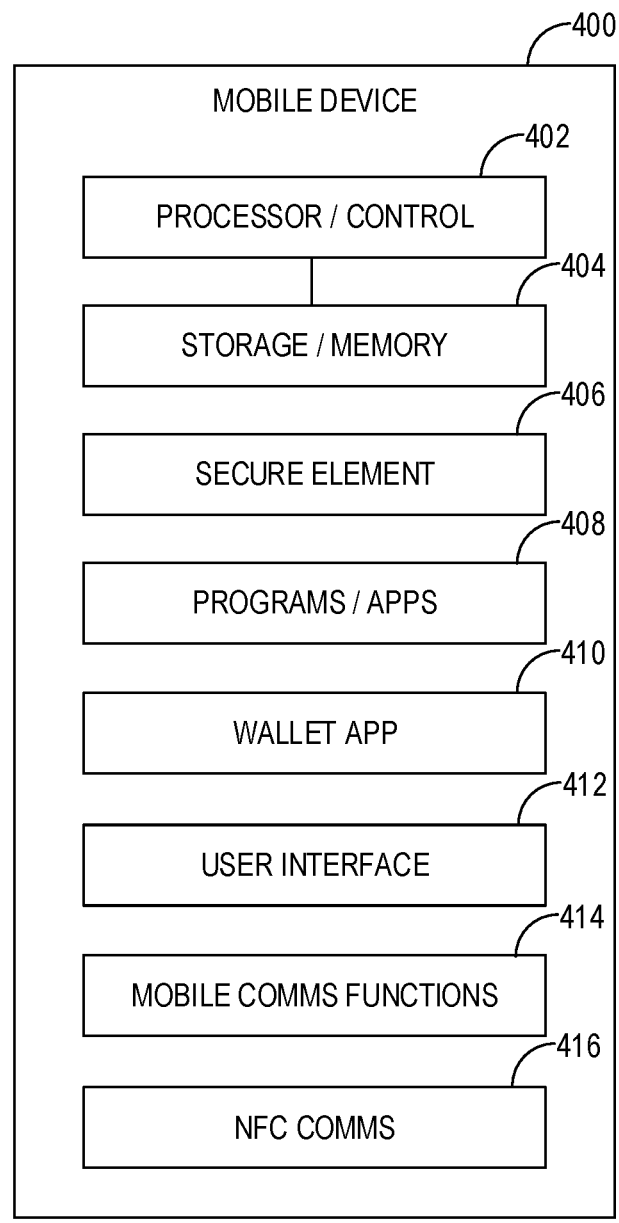
FIG. 4 is a simplified block diagram representation of a payment-enabled mobile device provided in accordance with some embodiments.

FIG. 4 is a block diagram of an example embodiment of a payment-enabled mobile device 400 that may be operated as the user device 110 of FIG. 1. The mobile device 400 may include a housing or body which may include a touchscreen or other input and output device (not separately shown in FIG. 4). The mobile device 400 further includes a mobile processor/control circuit 402, which is contained within the housing. Also included in the mobile device 400 is a storage/memory device or devices 404. The storage/memory devices 404 are in communication with the processor/control circuit 402 and may contain program instructions to control the processor/control circuit 402 to manage and perform various functions of the mobile device 400. As is well-known, a device such as mobile device 400 may function as what is in effect a pocket-sized personal computer (assuming for example that the mobile device is a smartphone), via programming with a number of application programs, or "applications," as well as a mobile operating system (OS). Also shown as part of the mobile device 400 is a secure element (SE) 406. The SE 406 may be physically separate from the processor/control circuit 402 and the storage/memory devices 404 but may functionally overlap with elements 402 and 404. The SE 406 may be conventional in its construction and functionality but may store one or more programs/applications and/or data structures that are involved in the functioning of the mobile device 400 in accordance with the teachings of the present disclosure. As is familiar to those who are skilled in the art, the SE 406 may provide enhanced protection from compromise for sensitive data/functionality related to payment operations of the mobile device 400. The programs/applications that run on the processor/control circuit 402 and/or the SE 406 are represented at block 408 in FIG. 4, and may, along with other programs, in practice be stored in block 404 (or the SE 406), to program the processor/control circuit 402 (or processing components of the SE 406).

Also shown in FIG. 4 is a wallet application 410. The wallet application 410 is shown apart from the other applications represented at block 408, in part due to the particular relevance of the wallet application 410 to the subject of this disclosure. In some embodiments, the wallet application 411 may resemble a typical wallet application as previously proposed for or implemented in payment-enabled mobile devices. However, the wallet application 411 may also, in accordance with teachings of this disclosure, have further capabilities for automatically authorizing payment transactions as described herein. Such further capabilities are described in further detail herein, particularly in connection with FIGS. 2 and 3.

As is typical for mobile devices, the mobile device 400 may include mobile communications functions as represented by block 414. The mobile communications functions 414 may include voice and data communications via a mobile communication network (not shown) with which the mobile device 400 is registered. The mobile communication functions 414 may be availed of by the mobile device 400 in connection with remote communications between the mobile device 400 and the merchant 140, as shown in FIG. 1.

In addition (and continuing to refer to FIG. 4), to facilitate use as a device 110 for contactless payment transactions at the point of sale, the mobile device 400 may include short-range radio communications capabilities (block 416), including for example near field communication "NFC" capabilities. Thus block 416 may include a suitable antenna (not separately shown) that is appropriate for NFC communications as well as driving and receiving circuitry associated with the antenna. It will be appreciated that the NFC antenna may be separate and different from the antenna (not separately shown) utilized by the mobile device 400 for the mobile communication functions represented by block 414.

From the foregoing discussion, it will be appreciated that the blocks depicted in FIG. 4 as components of the mobile device 400 may in effect overlap with each other, and/or there may be functional connections among the blocks which are not explicitly shown in the drawing. It may also be assumed that, like a typical smartphone, the mobile device 400 may include a rechargeable battery (not shown) that is contained within the housing and that provides electrical power to the active components of the mobile device 400.

It has been posited that the mobile device 400 may be embodied as a smartphone, but this assumption is not intended to be limiting, as mobile device 400 may alternatively, in at least some cases, be constituted by a tablet computer or smartwatch or by other types of portable electronic devices. In other embodiments, a smart speaker may be programmed so as to perform some of the functions attributed herein to the mobile device 400.

In some embodiments, an SE is not included in the mobile device 400, but security for the payment functionality of the mobile device 400 may be enhanced by known alternatives to an SE, such as a TEE (trusted execution environment).

Figure 5:
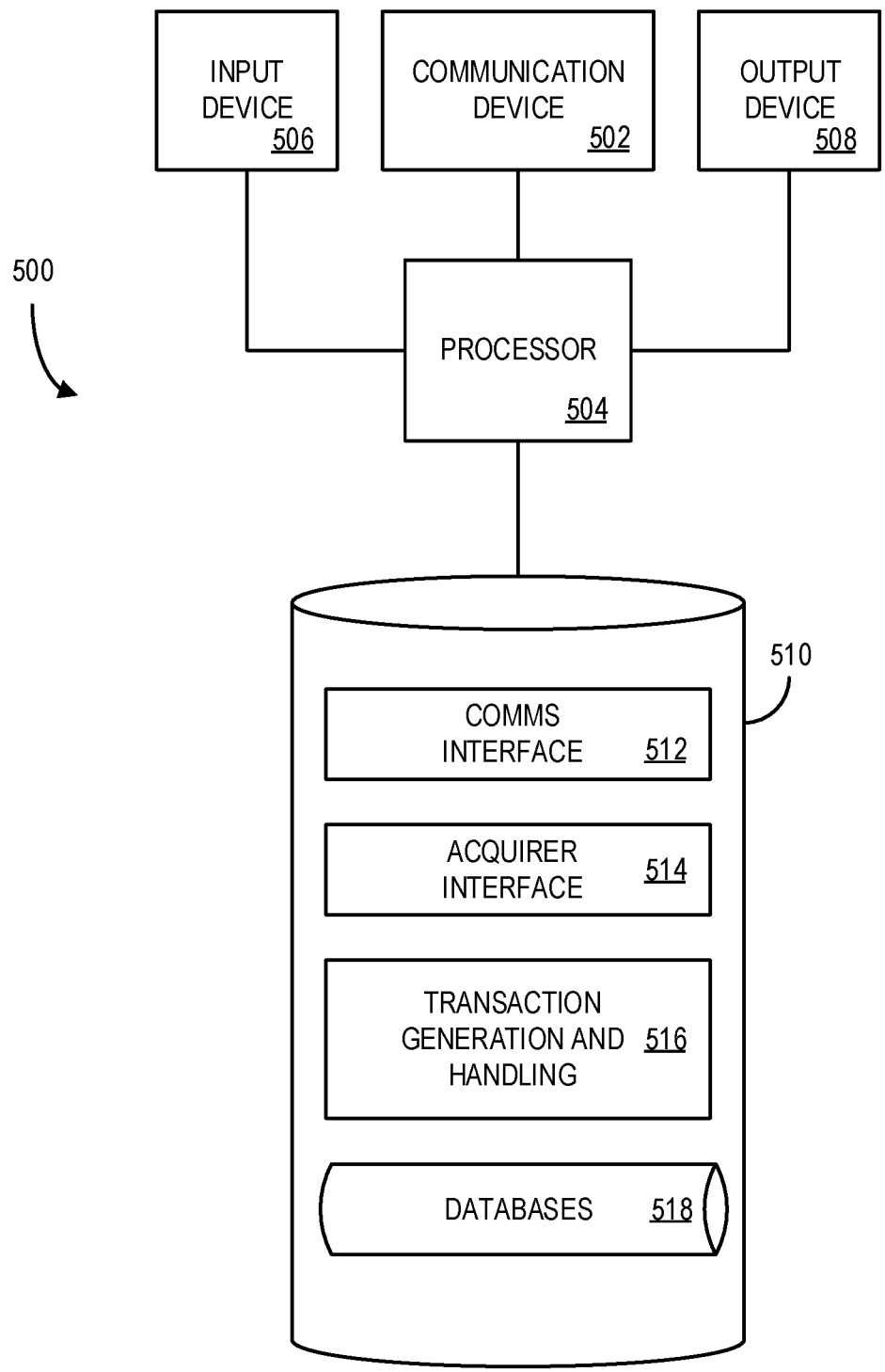
FIGS. 5 and 6 are respectively block diagram illustrations of computer systems that may play a role in the system of FIG. 1.

FIG. 5 is a block diagram that illustrates an example embodiment of a computer system 500 that may constitute the merchant device 140 of FIG. 1. The computer 500 will therefore be referred to as the "merchant computer." The merchant computer 500 may, in its hardware aspects, resemble a server, but may be controlled by software to cause it to function as described herein. Referring to FIG. 5, the merchant computer 500 may include a computer processor 504 operatively coupled to a communication device 502, a storage device 510, an input device 506 and an output device 508. The communications device 502, the storage device 510, the input device 506 and the output device 508 may all be in communication with the processor 504. The computer processor 504 may be constituted by one or more processors. Processor 504 operates to execute processor-executable steps, contained in program instructions described below, so as to control the merchant computer 500 to provide desired functionality.

Communication device 502 may be used to facilitate communication with, for example, other devices such as consumers' payment-enabled mobile devices 110 and also with the merchant acquirer 150. Communication device 501 may comprise numerous communication ports (not separately shown), to allow the merchant computer 500 to communicate simultaneously with numerous mobile devices to request and process numerous payment transactions. Input device 506 may comprise one or more of any type of peripheral device typically used to input data into a computer. For example, the input device 506 may include a keyboard and a mouse. Output device 508 may comprise, for example, a display and/or a printer.

Storage device 510 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory. Storage device 510 stores one or more programs for controlling processor 504. The programs comprise program instructions (which may be referred to as computer readable program code means) that contain processor-executable process steps of the merchant computer 500, executed by the processor 504 to cause the merchant computer 500 to function as described herein.

The programs may include one or more conventional operating systems (not shown) that control the processor 504 so as to manage and coordinate activities and sharing of resources in the merchant computer 500, and to serve as a host for application programs (described below) that run on the merchant computer 500. The storage device 510 may also store a communication software interface 512. The communication software interface 512 may control the merchant computer 500 to facilitate communication between the merchant computer 500 and user devices 110 (and connected user devices 120).

The programs stored in the storage device 510 may also include an acquirer software interface 514 for facilitating communication between the merchant computer 500 and the merchant's acquirer's computer. The storage device 510 may in addition store a transaction generating, requesting and handling application program 516. The transaction application program 516 may control the processor 504 to cause the merchant computer 500 to generate and transmit requests for payment transactions, and to execute requested payment transactions authorized by consumers' mobile device, as described herein.

The storage device 510 may also store, and merchant computer 500 may also execute, other programs, which are not shown. For example, such programs may include a reporting application. The latter program may respond to requests from system administrators for reports on the activities performed by the merchant computer 500. The other programs may also include, e.g., device drivers, database management software, etc. Moreover, the storage device 510 may also store one or more databases 518 needed for operation of the merchant computer 500.

Figure 6:
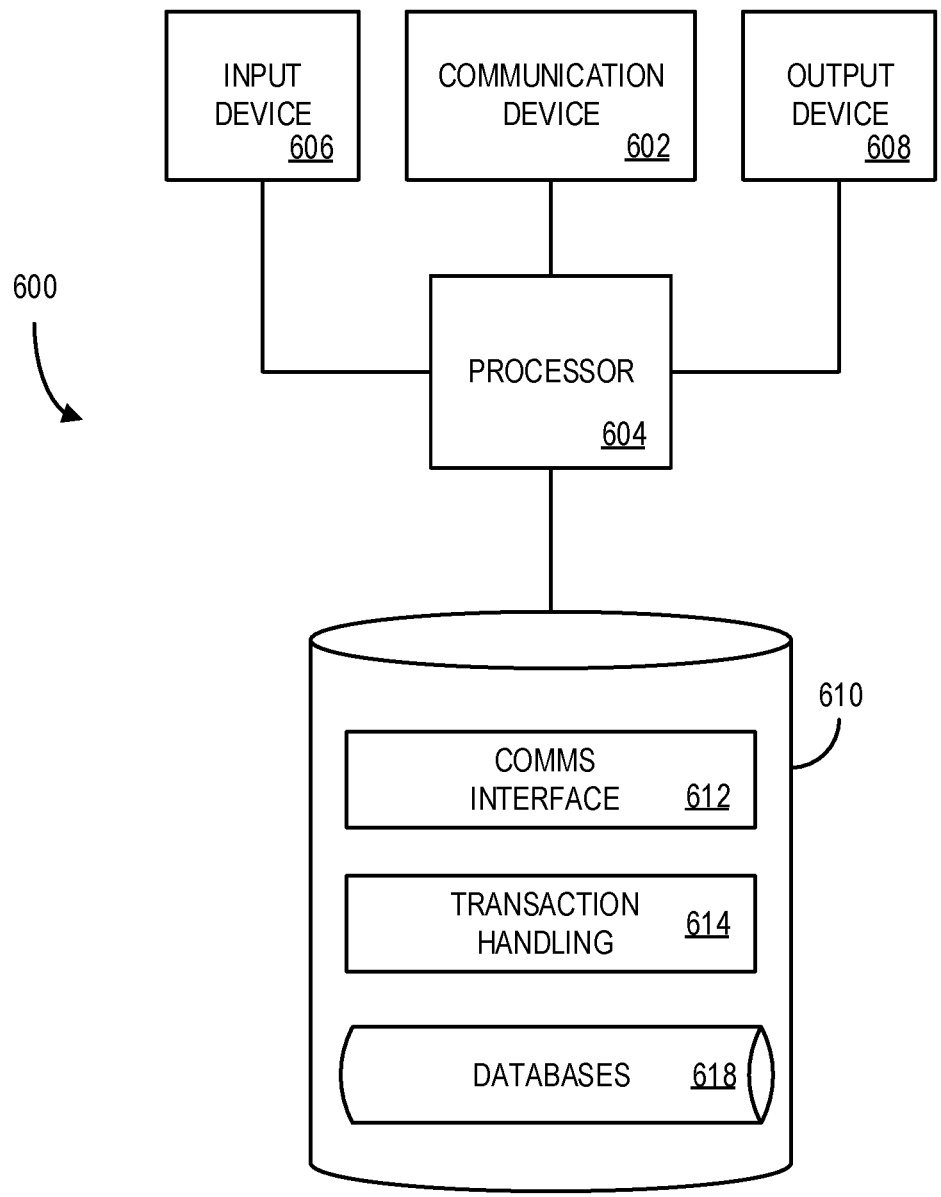

FIG. 6 is a block diagram that illustrates an example embodiment of a payment server computer 600 (such as the payment server 170 of FIG. 1). The payment server computer 600 may have the same type of architecture and may feature the same types of components as discussed above in connection with FIG. 5. Referring to FIG. 6, the payment server computer 600 may include a computer processor 604 operatively coupled to a communication device 602, a storage device 610, an input device 606 and an output device 608. The communications device 602, the storage device 610, the input device 606 and the output device 608 may all be in communication with the processor 604.

Storage device 610 stores one or more programs for controlling processor 604. The programs comprise program instructions (which may be referred to as computer readable program code means) that contain processor-executable process steps of the payment server computer 600 executed by the processor 604 to cause the payment server computer 600 to function as described herein. The programs may include one or more conventional operating systems (not shown) that control the processor 604 so as to manage and coordinate activities and sharing of resources in the payment server computer 600, and to serve as a host for application programs (described below) that run on the payment server computer 600.

The storage device 610 may also store communication software interfaces 612. The communication software interfaces 612 may control the payment server computer 600 to facilitate communication between the payment server computer 600 and other computers, including numerous merchant devices 140 that transmit transaction requests to the payment server computer 600. The storage device 610 may in addition store a transaction handling application program 614. The transaction handling application program 614 may control the processor 604 to cause the payment server computer 600 to determine whether to authorize requested transactions, and to authorize such transactions when it is appropriate to do so.

The storage device 610 may also store, and the payment server computer 600 may also execute, other programs, which are not shown. For example, such programs may include a reporting application. The latter program may respond to requests from system administrators for reports on the activities performed by the payment server computer 600. The other programs may also include, e.g., device drivers, database management software, etc.

Moreover, the storage device 610 may store one or more databases 618 needed for operation of the payment server computer 600. For example, in some embodiments, databases 618 may include data storage of one or more rule data sets stored on behalf of one or more users operating user devices 110. Such rules may be used to approve proposed transactions submitted by merchants 140 as described elsewhere herein.

With systems and processes such as those illustrated herein, use of card-on-file arrangements for recurring or follow-up payments may be dispensed with, in favor of device-based, rule-determined, unattended authorization of payment transactions proposed by merchants/service providers. The system is strengthened in terms of security by the generation and verification of a cryptogram for each transaction. A further gain in security may come from avoiding storage of payment credentials by merchants whose data security arrangements may suffer successful attacks. In general, with security features residing more at the "edge" of the payment system, rather than in centralized facilities, the overall security profile of the system may be enhanced.

The teachings of this disclosure may also result in increased convenience for users. For example, to cancel a (say, monthly) subscription, the user need only disable—on his/her mobile device—the transaction authorization rule that corresponds to the subscription in question. In other words, it may not be necessary for the user to contact the merchant/service provider in order to cancel his/her subscription.

A further possible convenience for the user may happen in cases where the user wishes to change or update the payment system account from which payments are being made to a given merchant. To accomplish such a change or update, the user need only change or update the relevant transaction authorization rule in the mobile device (or perform a corresponding change in operation of the mobile device's wallet application; or simply change the account—if there is only one—provisioned to the mobile device). Again, it would not be necessary to contact the merchant to implement the change or update of account.

Primarily, up to this point, exemplary embodiments described herein have involved the type of recurring payment arising from streaming service subscriptions or the like. It should be apparent that many other types of recurring payments may be handled in accordance with teachings of this disclosure. For example, the teachings of this disclosure are applicable to recurring payments to utility companies, where the utilities take the role of merchants and request payment every month from the users' payment-enabled mobile devices. In such situations, the relevant transaction authorization rules stored in the user's device may be open or somewhat open (i.e., may define a range of amounts) as to the permissible transaction amount.

The teachings of this disclosure are also applicable to recurring payments for internet service, for cable television service, for (landline) phone service, for bundled telecommunication services, for mobile phone service, for rent, for car payments, for mortgage payments, for newspaper and magazine subscriptions, etc.

For some recurring payments, the relevant transaction authorization rule may allow for annual increases of, say, up to 10% in the pre-authorized transaction amount. In some embodiments, the rules engine may have artificial intelligence features that allow the rules engine to in effect "negotiate" with the merchant when the merchant proposes, say, an increase in a recurring payment amount.

In some embodiments, a user may instruct a digital virtual assistant to establish a subscription and store a corresponding transaction rule in the user's mobile device or smart speaker, as the case may be. For example, the user may speak the following command to his/her mobile phone— "Siri, get a digital subscription to the Washington Post." The mobile phone would then contact the newspaper via the newspaper's website, request that a subscription be started for viewing the online version of the publication on the mobile phone, and store an appropriate transaction authorization rule to support the recurring (and possibly also the inaugural) payment for the subscription.

Similarly, the user may speak the following command to his/her smart speaker-"Alexa, get a subscription to Hulu." The smart speaker then may contact the streaming service to start the subscription and would set up the necessary transaction authorization rule to be securely stored in the smart speaker or in a payments accessory module connected to the smart speaker.

It is generally contemplated that other devices besides a payment-enabled mobile device can perform the functions referred to in FIGS. 2 and 3, assuming such devices have adequate security features to protect the transaction authorization rules and the payment credentials and related functionality. In the case of a mobile device, an SE is not necessarily required, but rather may be replaced with other security features such as are currently known or developed in the future.

In some instances, the payment account (or payment token) used for the requested and automatically authorized transaction may be restricted so as not to be allowed to be used in transactions that do not include a cryptogram. That is, the account issuer—in such a case—would decline any transaction using that account or token if a transaction cryptogram is not provided.

Referring again to the rules engine mentioned above, artificial intelligence features in the rules engine may enable to the engine to perform fraud screening and/or to spontaneously adapt or generate rules according to purchasing patterns by the user, as observed by the rules engine.

It has been mentioned hereinabove that a transaction authorization rule may have provisions for permitting annual subscription rate increases up to a given percentage. Alternatively, the merchant may be required to request an update to the relevant rule to increase the pre-authorized amount of the payment. This request may be sent from the merchant to the mobile device. In some instances, the rules engine may handle the request without action on the part of the user. In other embodiments, the user may be requested to approve the proposed increase in the transaction amount.

It may be advisable for all of the stored transaction authorization rules stored in the mobile device to be backed up "in the cloud" or in a remote payment services server computer. With such back-up, if the mobile device is lost or replaced, the rules can readily be downloaded from the back-up facility to the replacement mobile device.

In the foregoing discussion, example processes supplied payment system account numbers (e.g., PANs—primary account numbers) or payment tokens to the requesting merchant devices. Alternatively, the mobile device (or other type of device, as the case may be) may provide a bank account number as a payment credential, and ACH (automated clearing house) transactions or other types of transactions may be used in lieu of the payment system "rails."

Up to this point in the disclosure, rule-controlled release of information has been described in the context of requests from merchants for payment account system transactions. However, it is also contemplated that similar approaches could be applied to pre-authorize other automatic uploads of information from a mobile device or other consumer device (or from remote servers). For example, one or more categories of contact information or medical information may be made subject to automatic uploading on request from a requesting device, if the request satisfies a previously stored information-release authorization rule.

As used herein and in the appended claims, the term "computer" should be understood to encompass a single computer or two or more computers in communication with each other.

As used herein and in the appended claims, the term "processor" should be understood to encompass a single processor or two or more processors in communication with each other. As used herein and in the appended claims, the term "memory" should be understood to encompass a single memory or storage device or two or more memories or storage devices. As used herein and in the appended claims, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of steps.

As used herein and in the appended claims, the term "payment card system account" or "payment account" includes a credit card account, a deposit account that the account holder may access using a debit card, a prepaid card account, or any other type of account from which payment transactions may be consummated. The terms "payment card system account" and "payment card account" and "payment system account" and "payment account" are used interchangeably herein. The term "payment card account number" includes a number that identifies a payment card system account or a number carried by a payment card, or a number that is used to route a transaction in a payment system that handles payment card transactions. The term "payment card" includes a credit card, debit card, prepaid card, or other type of payment instrument, whether an actual physical card, electronic, or virtual.

As used herein and in the appended claims, the term "payment card system" or "payment account system" or "payment card account system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific example embodiments, it should be understood that various changes, substitutions, and alterations apparent to those skilled in the art can be made to the disclosed embodiments without departing from the spirit and scope of the appended claims.

What is claimed is:

1. A method for handling requests for payment without user involvement comprising:
    receiving, in a mobile device from a merchant device, a transaction request message, the transaction request message specifying transaction attributes comprising a merchant identifier, a monetary amount and an indication of an ongoing service for a proposed payment transaction involving a user of the mobile device and a merchant;
    comparing, by the mobile device, the transaction attributes with a permitted transaction rule stored in the mobile device;
    determining, by the mobile device, that the transaction attributes satisfy the permitted transaction rule confirming that the transaction request was pre-authorized by the user;
    approving, by the mobile device, the proposed transaction without user involvement;
    generating, by the mobile device in response to the approving, a transaction cryptogram; and
    transmitting, by the mobile device, the transaction cryptogram to the merchant device for use in completing the proposed payment transaction.

2. The method of claim 1, further comprising:
    selecting, by the mobile device, a payment account for use in completing the proposed payment transaction; and
    transmitting, by the mobile device, information associated with the payment account with the transaction cryptogram to the merchant device for use in completing the proposed payment transaction.

3. The method of claim 1, wherein the transaction attributes further comprise at least one of: a SKU and a date of the transaction request message.

4. The method of claim 1, wherein the transaction attributes are stored on the mobile device and are accessible to a wallet application.

5. The method of claim 1, wherein the transaction attributes are specified by a user of the mobile device.

6. The method of claim 1, wherein the transaction attributes are provided from a connected user device.

7. The method of claim 6, wherein the connected user device is one of (i) a smart speaker, (ii) an internet connected device, and (iii) an account of the user associated with a merchant.

8. The method of claim 1, wherein the indication of the ongoing service is associated with a recurring transaction and the merchant does not store a payment account of the user.

9. The method of claim 1, wherein the permitted transaction rule is established by a machine learning module on behalf of a user.

10. A non-transitory, computer-readable medium storing instructions, that, when executed by a processor of a mobile device of a user, cause the processor to perform a method for handling requests for payment without user involvement comprising:
  receiving a transaction request message from a merchant device, the transaction request message specifying transaction attributes comprising a merchant identifier, a monetary amount and an indication of an ongoing service for a proposed payment transaction involving a user and a merchant;
  comparing the transaction attributes with a permitted transaction rule;
  determining that the transaction attributes satisfy the permitted transaction rule confirming that the transaction request was pre-authorized by the user;
  approving the proposed transaction without user involvement;
  generating a transaction cryptogram in response to the approving; and
  transmitting the transaction cryptogram to the merchant device for use in completing the proposed payment transaction.

11. The non-transitory, computer-readable medium of claim 10, wherein the transaction request message is received by a payment server in communication with a mobile device associated with the user.

12. The non-transitory, computer-readable medium of claim 10, further storing instructions that, when executed by a processor, further cause the processor to perform a method comprising:
  selecting a payment account for use in completing the proposed payment transaction; and
  transmitting information associated with the payment account with the transaction cryptogram to the merchant device for use in completing the proposed payment transaction.

13. The non-transitory, computer-readable medium of claim 10, wherein the indication of the ongoing service is associated with a recurring transaction and the merchant does not store a payment account of the user.

14. The non-transitory, computer-readable medium of claim 10, wherein the permitted transaction rule is established by a machine learning module on behalf of a user.

* * * * *